Patented Sept. 1, 1936

2,052,879

UNITED STATES PATENT OFFICE 2,052,879

PROCESS FOR THE SIMULTANEOUS PRODUCTION OF PIG IRON AND PORTLAND CEMENT

Ernst Karwat, Grosshesselohe, near Munich, Germany, assignor, by mesne assignments, to Union Carbide and Carbon Corporation, a corporation of New York No Drawing. Application February 4, 1935, Serial No. 4,991. In Germany February 17, 1934

5 Claims. (Cl. 75—30)

This invention relates to the manufacture of Portland cement in pig iron blast furnaces, and has for its object the elimination of difficulties due to the excessive quantity and high basicity of slags developed in the shaft of furnaces operating on such a manufacturing process.

Experiments in the production of pig iron together with a slag having the composition of Portland cement, by means of adding extra free lime or its equivalent to the blast furnace charge and enriching the blast with oxygen, have shown that, in order to hold the slag volume low enough, only those ores can be processed the silicic acid content of which does not exceed a certain percentage. With ores of higher silicic acid content the resulting larger slag volume causes difficulties in the operation of the furnace through hanging of the charge in the shaft.

I have discovered that such difficulties in the smelting of ores rich in silicic acid can be prevented by using a special coke to which so much lime (in addition to that required by the sulfur) has been added during manufacture, through the addition of finely ground limestone or lime to the raw coal, as is required to combine with the silicic acid and the alumina of the coal ash for the formation of Portland cement slag in the blast furnace hearth. Only that quantity of free limestone need then be added to the furnace charge which is required to supply lime for combining with the silicic acid and alumina contained in the ore to form Portland cement slag. The advantage of this method of operation is that both the quantity and the basicity of the preliminary slags produced in the shaft are thereby diminished, whereby the charge in the shaft is kept loose and permeable to the gases passing upward through the furnace. In general, according to previous methods of operation, for every 1000 pounds of cement slag produced approximately 915 pounds are formed in the shaft from the ore and free limestone, while only about 85 pounds are produced in the hearth from the coke ash. According to the process of the present invention, only 740 pounds of slag are formed in the shaft from the ore and free limestone while 260 pounds are carried by the coke down through the shaft into the hearth. In previous processes for the production of Portland cement slag in a blast furnace, the ratio of free lime to silicic acid in the ore was usually about 4.4; by means of the present invention whereby a large part of the lime is bound to the coke, this ratio is reduced to 3.2. I have found that with a free lime-silicic acid ratio in the shaft of 3.2, uninterrupted operation of the furnace can easily be attained through enrichment of the blast with oxygen. But if normal coke is utilized and such a ratio maintained, a final slag is obtained in which the ratio of lime to silicic acid is only about 2.4. With the process of the present invention, however, one obtains excellent furnace operation in spite of the great total slag volume, together with a final slag which is as rich in lime as is required for utilization as Portland cement. Inasmuch as it has heretofore been possible to attain uninterrupted furnace operation only with ores which were very poor in silicic acid, the new process appreciably increases the number of ores which can be smelted to Portland cement slag.

The incorporation of the lime into the coke is preferably effected during its manufacture, by mixing ground limestone with the fine coal prior to coking. In place of limestone, ores with high lime content may also be combined in the coke which results in the additional advantage that the solidity and reactivity of the coke is increased.

The addition of limestone or lime to coke for the purpose of binding the sulfur contained in the coal is already known. However, the utilization of a lime-containing coke in the production of cement slag in the blast furnace, for the purpose of reducing the volume of slag formed in the shaft, and the particular feature of combining so much lime in the coke as is required by the silicic acid and alumina of the coal ash for the formation of Portland cement in the hearth, is new.

The addition of limestone to the fine coal for the coking process results in binding the sulfur of the coal to the lime to a greater extent than is possible with normal coke. As a result, the blast furnace slag smelted with this type of coke contains more sulfur than when normal coke is used. This does not, however, harmfully influence the quality of the pig iron produced, inasmuch as the high lime content of the slags together with the high hearth temperatures, assures a sufficient desulfurization of the iron. After tapping, the sulfur can easily be removed from the slag by means of blowing with oxygen or oxygen-containing gases, or through oxidizing admixtures such as limestone, iron oxide or rock salt.

I claim:

1. In a process for the simultaneous production in a blast furnace of pig iron and Portland cement the method which comprises feeding with the coke, as an integral part thereof, sufficient lime to form with the coke-ash a slag of cement composition, the amount of lime so fed being a minor proportion of the total basic flux fed in the charge.

2. In a process for the simultaneous production in a blast furnace of pig iron and Portland cement the method which comprises feeding with the coke, as an integral part thereof, sufficient iron ore rich in lime to form with the coke-ash a slag of cement composition, the amount of iron ore and of basic flux so fed being a minor proportion of the total amount of iron ore and flux fed with the charge.

3. In a process for the simultaneous production in a blast furnace of pig iron and Portland cement the method which comprises using as fuel, coke formed by coking a mixture of coal and lime so proportioned that the lime incorporated into the resultant coke may combine with the ash of the coal to form a slag having the approximate composition of Portland cement, the amount of lime so fed being a minor proportion of the total basic flux fed in the charge.

4. In a process for the simultaneous production in a blast furnace of pig iron and Portland cement the method which comprises using as fuel, coke formed by coking a mixture of coal and limestone so proportioned that the lime so incorporated into the resultant coke may combine with the ash of the coal to form a slag having the approximate composition of Portland cement, the amount of lime so fed being a minor proportion of the total basic flux fed in the charge.

5. In a process for the simultaneous production in a blast furnace of pig iron and Portland cement, the method which comprises using as fuel, coke briquetted with iron ore high in lime content, the coke and iron ore being so proportioned that upon combustion of said briquettes a slag having the approximate composition of Portland cement will be formed, the slag so formed being a minor proportion of the total slag produced.

ERNST KARWAT.